(12) United States Patent
Chang et al.

(10) Patent No.: US 6,385,216 B1
(45) Date of Patent: May 7, 2002

(54) OPTICAL FIBER MODE-LOCKED LASER

(75) Inventors: Do Il Chang; Ho Young Kim; Kyong Hon Kim; Min Yong Jeon, all of Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/439,595

(22) Filed: Nov. 12, 1999

(30) Foreign Application Priority Data

Dec. 3, 1998 (KR) ........................................ 1998-52932

(51) Int. Cl.$^7$ .............................................. H01S 3/067
(52) U.S. Cl. ................................ 372/6; 372/18; 372/27
(58) Field of Search .................................. 372/6, 18, 27

(56) References Cited

U.S. PATENT DOCUMENTS

| | | |
|---|---|---|
| 5,050,183 A | 9/1991 | Duling, III |
| 5,546,414 A | 8/1996 | Pleiffer |
| 5,734,665 A | 3/1998 | Jeon et al. |
| 6,122,419 A * | 9/2000 | Kurokawa et al. ............ 372/99 |

OTHER PUBLICATIONS

V.J. Matsas, et al., *Self–Starting, Passively Mode–Locked Fabry–Perot Fiber Soliton Laser Using Nonlinear Polarization Evolution*, May 1993, pp. 492–494.

H.A. Haus, et al., *Additive–Pulse Modelocking in Fiber Lasers*, Jan. 1994, pp. 2090–208.

P.G. Bollond et al., *Characterization of Nonlinear Switching in a Figure–of–Eight Fiber Laser Using Frequency–Resolved Optical Gating*, Mar. 1998, pp. 343–345.

* cited by examiner

*Primary Examiner*—James W. Davie
*Assistant Examiner*—Cornelius H Jackson
(74) *Attorney, Agent, or Firm*—Cohen, Pontani, Lieberman & Pavane

(57) ABSTRACT

An optical fiber mode-locked laser is disclosed. The laser comprises a gain medium doped optical fiber to achieve a population inversion between high and low energy levels by a pump light source and to oscillate optical waves in sequence, a cholesteric liquid crystal circular polarization mirror to transmit the waves from the pump light source and to be operated as a circular polarization reflection mirror for the oscillated optical waves from the gain medium doped optical fiber, a polarization controller to control the polarization state of the proceeding light which is oscillated from the gain medium doped optical fiber, a dispersion shifted fiber to give a non-linear effect to the proceeding light through the polarization controller, and an optical fiber laser output mirror which forms a resonator by putting out some portion of the proceeding light by transmission and reflecting the other portion of the light. With the present invention, one can effectively produce an ultrashort pulse with a simple structure and a few parts thereby improve an economic competence.

2 Claims, 3 Drawing Sheets

OPTICAL FIBER MODE-LOCKED LASER

BACKGROUND OF THE INVENTION

1. Field of the Invention

The present invention relates to an optical fiber mode-locked laser to produce an ultrashort pulse, and more particularly to an optical fiber laser simplifying the structure by using a cholesteric liquid crystal circular polarization mirror and able to lower the threshold intensity of pump light required for mode locking operation.

2. Information Disclosure Statement

The ultrashort pulse originated from an optical fiber laser is one of the spotlighted light sources able to be used for high-speed optical communication due to its short pulse duration. The most effective method to produce an ultrashort pulse is mode-locking operation. Conventional mode-locked optical fiber laser is mostly achieved under figure-8 type or ring type resonator structure, and it can also be accomplished under the linear structure.

FIG. 1 is a view illustrating a structure of a conventional figure-8 type optical fiber mode-locked laser, FIG. 2 is a view illustrating a structure of a conventional ring type optical fiber mode-locked laser, and FIG. 3 is a view illustrating a structure of a conventional linear optical fiber mode-locked laser. In FIGS. 1, 2 and 3, the numeric 11 represents a (50:50) optical fiber directional coupler, 12 represents a wavelength division optical fiber coupler, 13 represents a (90:10) optical fiber directional coupler, 21 and 22 represent polarization controllers, 31 represents an optical isolator, 41 represents an erbium doped optical fiber, 42 represents a dispersion shifted fiber, 51 represents a light pumping laser diode, 61 represents a laser resonator mirror, 62 represents a laser output mirror, and 82 represents a linear polarizer respectively.

As mentioned above, in the conventional optical fiber laser, a mode-locked optical fiber laser is mostly achieved under figure-8 type (FIG. 1) or ring type (FIG. 2) structure. However, these methods have low efficiency and low economic competence since they have complex structures, need expensive optical parts, and losses are comparably high inside the resonator such as optical isolator. In the case of linear optical fiber mode-locked laser (FIG. 3), which does not need an optical isolator, however, it has a defect that the intensity of the pump light is relatively high to oscillate mode-locking operation due to the spatial hole burning by the formation of standing wave.

SUMMARY OF THE INVENTION

It is therefore the object of the present invention to provide an optical fiber laser to produce an ultrashort pulse, which is able to lower the threshold intensity of the pump light required for mode-locking operation and has simple structure by introducing cholesteric liquid crystal circular polarization mirror.

To achieve the object, the present invention comprises a gain medium doped optical fiber to achieve a population inversion between high and low energy levels by a pump light source and to oscillate optical waves in sequence, a cholesteric liquid crystal circular polarization mirror to transmit the waves from the pump light source and to be operated as a circular polarization reflection mirror for the oscillated optical waves from the gain medium doped optical fiber, a polarization controller to control the polarization state of the proceeding light which is oscillated from the gain medium doped optical fiber, a dispersion shifted fiber to give a non-linear effect to the proceeding light through the polarization controller, and an optical fiber laser output mirror which forms a resonator by putting out some portion of the proceeding light by transmission and reflecting the other portion of the light.

BRIEF DESCRIPTION OF THE DRAWINGS

The above object and other advantages of the present invention will become more apparent by describing in detail the preferred embodiment of the present invention with reference to the attached drawings in which.

Similar reference characters refer to similar parts in the several views of the drawings.

DETAILED DESCRIPTION OF THE INVENTION

Referring to appended drawings, detailed description of the present invention is now described.

Figure 1:
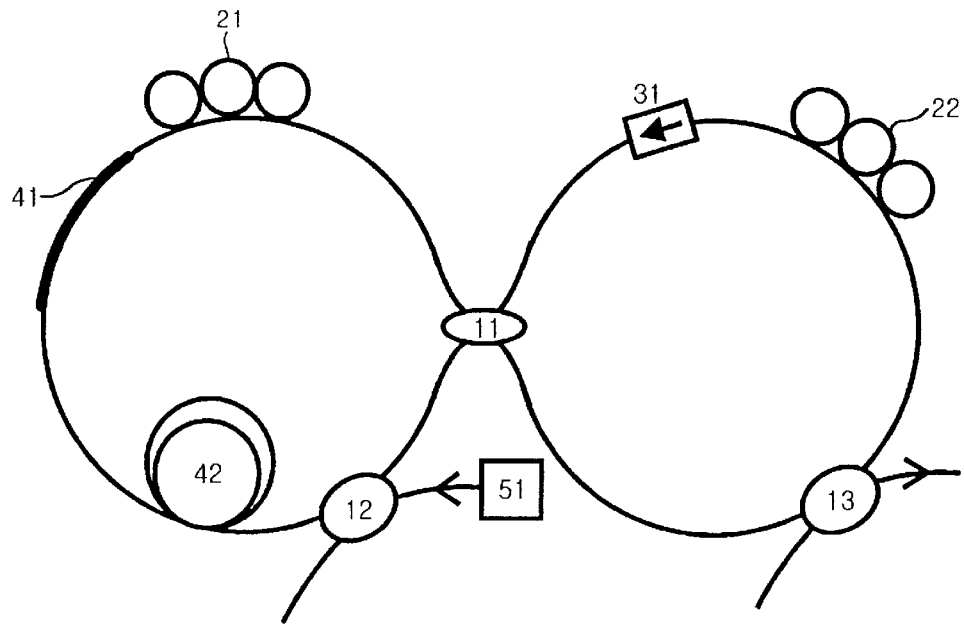
FIG. 1 is a view illustrating a structure of a conventional figure-8 type optical fiber mode-locked laser.
Figure 2:
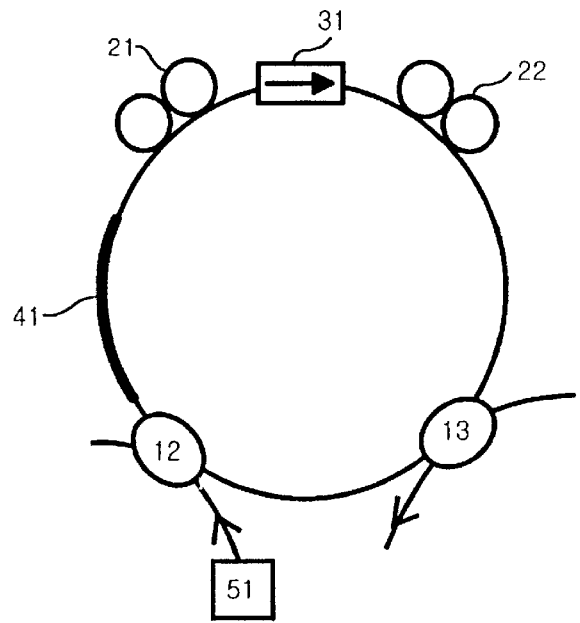
FIG. 2 is a view illustrating a structure of a conventional ring type optical fiber mode-locked laser.
Figure 3:
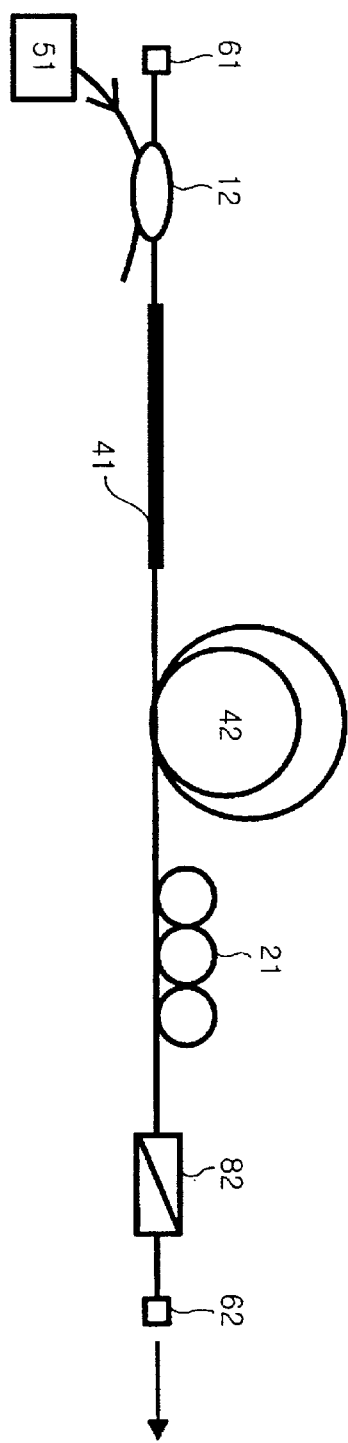
FIG. 3 is a view illustrating a structure of a conventional linear optical fiber mode-locked laser.
Figure 4:
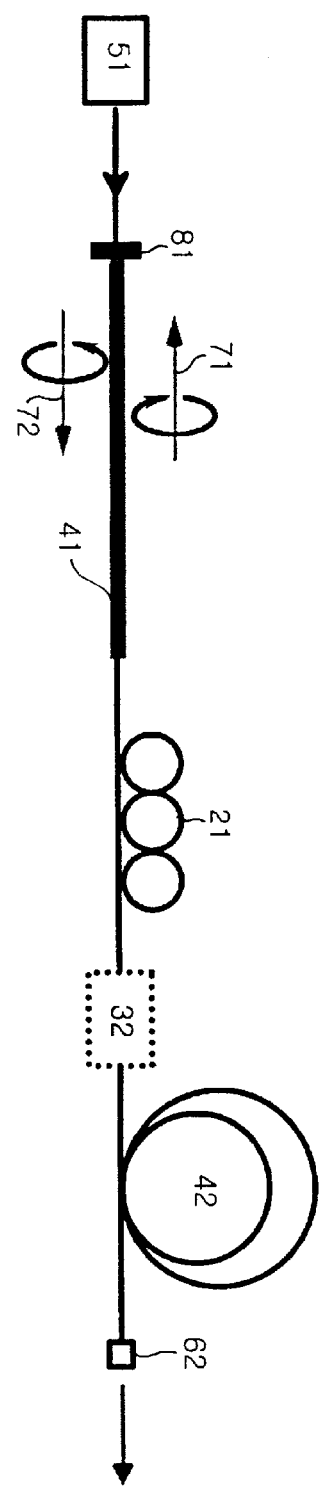
FIG. 4 is a view illustrating a structure of an optical fiber mode-locked laser in accordance with the present invention.

FIG. 4 is a view illustrating a structure of an optical fiber mode-locked laser in accordance with an embodiment of the present invention. The structure of a single longitudinal mode laser with a cholesteric liquid crystal polarization mirror 81 takes advantage of the intrinsic optical characteristic of selective reflection of cholesteric liquid crystal.

To operate an optical fiber mode-locked laser in accordance with an embodiment of the present invention, the pitch of cholesteric liquid crystal cell should be manufactured to be consistent with the wavelength of the light produced from the gain medium doped optical fiber by the pump light source. In this case, it can be operated whether the liquid crystal cell is manufactured left-handed type or right-handed type, however, the left-handedly manufactured case will be explained here.

If a liquid crystal cell is manufactured to be left-handed, it reflects left-handed circularly polarized light and transmit right-handed circularly polarized light for the incident light with the wavelength consistent with the pitch of the liquid crystal cell. It transmits the whole light regardless of its polarization state for the incident light with the wavelength inconsistent with the pitch of the liquid crystal cell. In case that the left-handed circularly polarized light reflects from an ordinary mirror, it is converted to right-handed circularly polarized light, however, when left-handed circularly polarized light reflects from a cholesteric liquid crystal, it is reflected as the same left-handed circularly polarized light without conversion. In other words, the left-handed circularly polarized light 71 proceeding left, which incidents on to left-handed cholesteric liquid crystal, is reflected as left-handed circularly polarized light 72 proceeding right.

Since the wavelength is inconsistent with the pitch of the liquid crystal cell, the light from light pumping laser diode 51 transmits through the cholesteric liquid crystal polarization mirror (in the present embodiment, left-handed cholesteric liquid crystal) 81 and is absorbed by gain medium doped optical fiber 41, therein produces laser light by causing stimulated scattering. The light produced in the gain medium doped optical fiber 41 is converted to the circularly polarized state 72 by cholesteric liquid crystal polarization mirror 81 and is reflected (in the present embodiment, as left-handedly circularly polarized light). The light is converted to an elliptically polarized light by polarization controller 21, thereafter its polarization state is changed additionally experiencing non-linear and residual linear birefringence in the dispersion shifting fiber 42. Some portion of the light transmits through laser output mirror 62 to come out and the other portion of the light reflects from the mirror to reexperience birefringence in the dispersion shifting fiber 42, to change its polarization state through polarization controller 21, thereafter to be reamplified in the gain medium doped optical fiber 41. During these procedures, the polarization state of the light is changed by birefringence in the dispersion shifting fiber 42 and the polarization controller 21, so that the polarization state of the incident light to the cholesteric liquid crystal polarization mirror 81 can be controlled by the polarization controller 21. The polarization state of the incident light to the cholesteric liquid crystal polarization mirror 81 is controlled to be left-handedly circularly polarized state by the polarization controller 21, thereon the incident light is totally reflected on the cholesteric liquid crystal polarization mirror 81 with the original polarization state 72.

Therefore, the optimum condition of the resonator to oscillate a laser is to control the polarization state of the incident light to the cholesteric liquid crystal polarization mirror 81 to be left-handed circularly polarized state 71 by the polarization controller 21.

The optimum condition to achieve a passive mode-locking in an optical fiber laser is that the reflection factor is set to be zero for continuous wave and maximum for pulse. Pulse proceeds with different polarization state from continuous wave because the intensity of the light is high, thereby it experiences more non-linear birefringence in the dispersion shifting fiber 42. Therefore, a passive mode-locking can be achieved by controlling the polarization controller 21 so that maximum reflection factor occurs for pulse. In this case, the laser resonance condition is well satisfied that, for the light proceeding for a single period, the polarization state of the oscillated light should be the same before and after the period. It is therefore expected that stable pulse signals come out because the polarization state is consistent during a period of the laser resonator while ultrashort pulse oscillates. A cholesteric liquid crystal polarization mirror 81 is suitable for the passive mode-locking operation because it can be manufactured with a very wide pitch according to the wavelength.

Note that the circular polarization states of the lights proceeding in both directions of the gain medium doped optical fiber 41 are consistent with each other due to the intrinsic reflection characteristic of cholesteric liquid crystal polarization mirror 81. Two lights with the same circular polarization states but with opposite proceeding directions can not interfere with each othe perpendicularly. Therefore, spatial hole burning, which causes a difficulty in the linear resonator, does not occur because there is no formation of a standing wave by the interference between two waves in the gain medium doped optical fiber 41. Moreover, if an optical modulator 32 is inserted in the laser resonator under this structure, mode-locked optical pulse of stable pulse signal with high repeatability can be oscillated by combining the passive-tupe and the active-type.

Since those having ordinary knowledge and skill in the art of the present invention will recognize additional modifications and applications within the scope thereof, the present invention is not limited to the embodiments and drawings described above.

As mentioned before, the structure of the mode-locked optical fiber laser in the present invention eliminates the defect of the linear resonator of spatial hole burning due to the formation of standing wave, thereby the required length of the optical fiber is reduced by half compared to the ring type resonator. And the mode-locked optical fiber laser in the present invention has a simple structure, requires only a few optical parts, and is able to achieve stable laser operation with high efficiency because it does not require high-loss, high-price devices such as an optical isolator. Therefore, it has a very strong economic competence.

What is claimed is:

1. An optical fiber mode-locked laser comprising:
   a gain medium doped optical fiber for achieving a population inversion between high and low energy levels by a pump light source;
   a cholesteric liquid crystal circular polarization mirror located between the pump light source and the doped optical fiber to pass light from the pump light source and to convert light from the doped optical fiber to a circular polarization state;
   a polarization controller coupled to convert the received circular polarized light to elliptically polarized light;
   an optical fiber laser output mirror for passing a portion of light and reflecting the other portion of the light; and
   a dispersion shifting fiber positioned between the polarization controller and the output mirror to change the non-linear residual birefringence of light passing there through.

2. The optical fiber mode-locked laser as claimed in claim 1, wherein an optical modulator is inserted in between said polarization controller and said dispersion shifted fiber to achieve a high repeatability by combining the passive-type and the active-type.

* * * * *